US012736696B2

(12) United States Patent
Poole

(10) Patent No.: US 12,736,696 B2
(45) Date of Patent: Sep. 15, 2026

(54) SYSTEM AND METHOD FOR WAVE EQUATION DECONVOLUTION FOR INTERNAL MULTIPLE ATTENUATION

(71) Applicant: CGG SERVICES SAS, Massy Cedex (FR)

(72) Inventor: Gordon Poole, East Grinstead (GB)

(73) Assignee: CGG SERVICES SAS, Massy Cedex (FR)

( * ) Notice: Subject to any disclaimer, the term of this patent is extended or adjusted under 35 U.S.C. 154(b) by 542 days.

(21) Appl. No.: 18/358,357

(22) Filed: Jul. 25, 2023

(65) Prior Publication Data

US 2024/0184004 A1 Jun. 6, 2024

Related U.S. Application Data

(60) Provisional application No. 63/430,143, filed on Dec. 5, 2022.

(51) Int. Cl.
*G01V 1/28* (2006.01)

(52) U.S. Cl.
CPC ........ *G01V 1/282* (2013.01); *G01V 2210/675* (2013.01)

(58) Field of Classification Search
CPC .. G01V 1/282; G01V 2210/675; G01V 1/364; G01V 2210/56; G01V 1/36
See application file for complete search history.

(56) References Cited

U.S. PATENT DOCUMENTS 8,570,831 B2 * 10/2013 Teague .................. G01V 1/364 367/24
9,817,143 B2 * 11/2017 van Groenestijn .... G01V 1/364
(Continued)

FOREIGN PATENT DOCUMENTS

AU 2014201497 A1 * 10/2014 ............ G01V 1/364
CA 2845962 A1 * 9/2014 ............ G01V 1/364
(Continued)

OTHER PUBLICATIONS

Zhang et al. , "Angle-Domain Common-Image Gathers for Imaging of Multiples Using Poynting Vectors", Feb. 13, 2023, IEEE Transactions on Geoscience and Remote Sensing, vol. 16, pp. 1-13 (Year: 2023).*

(Continued)

*Primary Examiner* — Mi'schita' Henson

(74) *Attorney, Agent, or Firm* — PATENT PORTFOLIO BUILDERS PLLC

(57) ABSTRACT

A method for internal multiple attenuation of seismic data associated with a subsurface. The method includes receiving seismic data d associated with the subsurface, wherein the seismic data d includes primaries and internal multiples, receiving a first reflectivity $r_1$ associated with a first formation in the subsurface, calculating a second reflectivity $r_2$ associated with a second formation in the subsurface, based on wavefield extrapolation of the seismic data d and a reflection in the first reflectivity $r_1$, wherein the second formation is different from the first formation, calculating the internal multiples using (1) wavefield extrapolation of the seismic data d, (2) the reflection in the first reflectivity $r_1$, and (3) a reflection in the second reflectivity $r_2$, attenuating the internal multiplies from the seismic data d by subtraction, and generating an image of the subsurface indicative of geophysical features associated with oil or gas resources.

17 Claims, 12 Drawing Sheets

(56) References Cited

U.S. PATENT DOCUMENTS

2002/0156583 A1* 10/2002 Sen .......................... G01V 1/38
702/17
2025/0155596 A1* 5/2025 Feng ........................ G01V 1/30

FOREIGN PATENT DOCUMENTS

GB 2633421 A * 3/2025 ............. G01V 1/282
WO WO-2016063125 A1 * 4/2016 ............. G01V 1/364

OTHER PUBLICATIONS

A. J. Berkhout et al., "Estimation of multiple scattering by iterative inversion, Part I: theoretical considerations," Geophysics, Sep.-Oct. 1997, vol. 62, No. 5, pp. 1586-1595.
A. Pica et al., "3D surface-related multiple modeling, principles and results," 75th SEG Annual International Meeting, Houston, 2005, pp. 2080-2083.
Antonio Pica et al., "Wave equation based internal multiple modeling in 3D," SEG Las Vegas 2008 Annual Meeting, pp. 2476-2480.
Arthur B. Weglein et al., "An inverse-scattering series method for attenuating multiples in seismic reflection data," Geophysics, Nov.-Dec. 1997, vol. 62, No. 6, pp. 1975-1989.
G. Poole, Tu R1 5 "Shallow water surface related multiple attenuation using multisailline 3D deconvolution imaging," 81st EAGE Conference and Exhibition, Jun. 3-6, 2019, London, United Kingdom, 5 pages.
Gordon Poole et al., "Adaption-Free OBN Demultiple Using Up-Down Deconvolution and Wave-Equation Deconvolution," 2022, EAGE Annual 83rd Conference & Exhibition, Madrid, Spain, 5 pages.
Gordon Poole et al., "Wave-equation deconvolution: A short-period demultiple tool for streamer, OBN and land environments," First Break, Dec. 2022, vol. 40, pp. 59-64.
Helmut Jacubowicz, "Wave equation predication and removal of interbed multiples," EAGE 60th Conference and Technical Exhibition, Leipzig, Germany, Jun. 8-12, 1998, 2 pages.
J. Biersteker, "MAGIC: Shell's surface multiple attenuation technique," Sep. 9-14, 2001, 71st SEG International Exposition and Annual Meeting, San Antonio, Texas, 4 pages.
M. Wang et al., "3D Inverse Scattering Series Method for Internal Multiple Attenuation," We E102 06 76th EAGE Conference & Exhibition 2014 Amsterdam RAI, The Netherlands, Jun. 16-19, 2014, 5 pages.
N. D. Whitmore et al., "Imaging of primaries and multiples using a dual-sensor towed streamer," SEG Denver 2010 Annual Meeting, pp. 3187-3193.

* cited by examiner

SYSTEM AND METHOD FOR WAVE EQUATION DECONVOLUTION FOR INTERNAL MULTIPLE ATTENUATION

BACKGROUND

Technical Field

Embodiments of the subject matter disclosed herein generally relate to processing seismic data acquired over land or water and, more specifically, to identifying internal multiples, which are included in the recorded seismic data, based on a wave equation deconvolution approach, and removing them from the recorded seismic data.

Discussion of the Background

Hydrocarbon exploration and development uses waves (e.g., seismic waves or electromagnetic waves) to explore the structure of underground formations on land and at sea (i.e., formations in the subsurface). These waves are collected during a seismic acquisition campaign, either on land or on water. Energy generated by a seismic source propagates as seismic waves downward into a geological formation, and part of the energy is reflected and/or refracted back up to the surface. Characteristics of the reflected/refracted energy detected by seismic sensors are used to produce an image of the earth's reflectivity.

As schematically illustrated in FIG. 1, when a marine seismic acquisition system 100 is used, waves 112 emitted by a source 110 at a known location penetrate an unexplored formation 120, which is located below the water bottom 106, and are reflected at plural interfaces 122, 124, 126 that separate the formation's layers, as they have different layer impedances. Sensors 130 (only one shown for simplicity), which are distributed along a streamer 132 towed by a vessel 102 (for the case of a marine seismic survey), detect the reflected waves 140, 150. The detected waves 140, 150 include primary reflections such as wave 140, which travel directly from a formation interface to a sensor, and multiple reflections such as wave 150, which additionally undergo at least one more downward reflection and one upward reflection. In the case of wave 150 in this embodiment, the downward reflection is at the water surface 104 and the upward reflection is at reflector 122 and for this reason this multiple is called a surface related multiple. Other multiples exist as discussed later. Note that, as used herein, the term "formation" refers to any geophysical structure into which source energy is promulgated to perform seismic surveying, e.g., land or water based, such that a "formation" may include a water layer when the context is marine seismic surveying. A similar picture may be used to describe the rays for a land seismic survey, except that there is no reflection from the water surface as there is no water.

The recorded seismic waves include primary arrivals and various types of multiples, e.g., surface-related multiples and internal multiples. Most of the existing processing methods are designed to work best with the primary arrivals and thus, for these methods, the multiples need to be attenuated or fully removed. While there are methods adapted to work with the primary and the multiples, the multiples need to be identified and labeled as such. Thus, there is a continuous interest in the industry to separate and classify the primary arrivals and multiples.

Primary arrivals 210, which are illustrated in FIG. 2A, involve energy leaving the source S, interacting once (either reflecting, diffracting, refracting, etc., and described by quantity r) with an interface 124 in the subsurface, and then being recorded at a receiver R. Unfortunately, the primary wavefield is contaminated by multiples, which undergo additional interactions in the subsurface. Compared to primaries 210, marine surface related multiples 212, shown in FIG. 2B (also shown in FIG. 1), experience an additional down-going reflection at the free-surface 104, followed by a further up-going reflection at the interface 122 in the subsurface. When primaries corresponding to the multiple generators have been recorded, approaches such as Surface-Related Multiple Elimination (SRME) [1] or Surface-Related Multiple Modelling (SRMM) [2] methods may be employed to remove the surface-related multiples. In the case the primaries corresponding to the multiple generators have not been recorded, model-based multiple modelling approaches [3], deconvolution-based methods [4], or wave-equation deconvolution methods [5] may be used.

Internal multiples are an additional category of multiples. They are illustrated in FIG. 2C as multiples 214, where at least three interactions occur in the subsurface, the first up-going primary interaction, r, at interface 124, followed by a down-going interaction at interface 122, and a second up-going interaction at interface 124 or another interface. The primaries 210, the surface multiples 212, and the internal multiples 214 form the seismic data d 200 that is collected, for example, by the seismic survey shown in FIG. 1. This seismic data is also called input data herein. Methods to model internal multiples 214 include convolution-correlation based methods [6], wave-equation modelling methods [7], and internal scattering series methods [8, 9].

However, as is known in the seismic field, each of the methods discussed in this section can be ineffective under certain conditions/environments. Therefore, multiples removal remains a subject of continuing research, with new opportunities and challenges occurring as data acquisition systems evolve.

SUMMARY

According to an embodiment, there is a method for internal multiple attenuation of seismic data associated with a subsurface. The method includes receiving seismic data d associated with the subsurface, wherein the seismic data d includes primaries and internal multiples, receiving a first reflectivity $r_1$ associated with a first formation in the subsurface, calculating a second reflectivity $r_2$ associated with a second formation in the subsurface, based on wavefield extrapolation of the seismic data d and a reflection in the first reflectivity $r_1$, wherein the second formation is different from the first formation, calculating the internal multiples using (1) wavefield extrapolation of the seismic data d, (2) the reflection in the first reflectivity $r_1$, and (3) a reflection in the second reflectivity $r_2$, attenuating the internal multiples from the seismic data d by subtraction, and generating an image of the subsurface indicative of geophysical features associated with oil or gas resources.

According to another embodiment, there is a computing system for internal multiple attenuation of seismic data associated with a subsurface. The computing system includes an interface configured to receive seismic data d associated with the subsurface, wherein the seismic data d includes primaries and internal multiples, and also includes a processor connected to the interface. The processor is configured to receive a first reflectivity $r_1$ associated with a first formation in the subsurface, calculate a second reflectivity $r_2$ associated with a second formation in the subsurface, based on wavefield extrapolation of the seismic data d and a reflection in the first reflectivity $r_1$, wherein the second formation is different from the first formation, calculate the internal multiples using (1) wavefield extrapolation of the seismic data d, (2) the reflection in the first reflectivity $r_1$, and (3) a reflection in the second reflectivity $r_2$, attenuate the internal multiples from the seismic data d by subtraction, and generate an image of the subsurface indicative of geophysical features associated with oil or gas resources.

According to yet another embodiment, there is a method for internal multiple attenuation of seismic data associated with a subsurface, and the method includes receiving seismic data d associated with the subsurface, wherein the seismic data d includes primaries, surface related multiples, and internal multiples, generating an image of the subsurface based on the surface related multiples, applying a first mask to the image to generate a first reflectivity $r_1$, which is associated with a first formation in the subsurface, applying a second mask to the image to generate a second reflectivity $r_2$, which is associated with a second formation in the subsurface, estimating the internal multiples using (1) wavefield extrapolation of the seismic data d, (2) a reflection in the first reflectivity $r_1$, and (3) a reflection in the second reflectivity $r_2$, attenuating the internal multiples from the seismic data d by subtraction, to obtain demultiple data dd, and generating an improved image of the subsurface, which is indicative of geophysical features associated with oil or gas resources, based on the demultiple data dd.

According to yet another embodiment, there is a non-transitory computer readable medium including computer executable instructions, wherein the instructions, when executed by a processor, implement the methods discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6A illustrates internal multiples generated between the waterbottom and shallow gas reflectors while

FIG. 7A illustrates upper reflectivities found by inversion for the subsurface of FIG. 6A while

FIG. 8A shows the seismic data before internal demultiple attenuation, FIG. 8B shows the demultiple data using the approach of FIG. 3, and FIG. 8C illustrates the modelled internal multiples;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition. However, similar embodiments and methods may be used for a land data acquisition system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
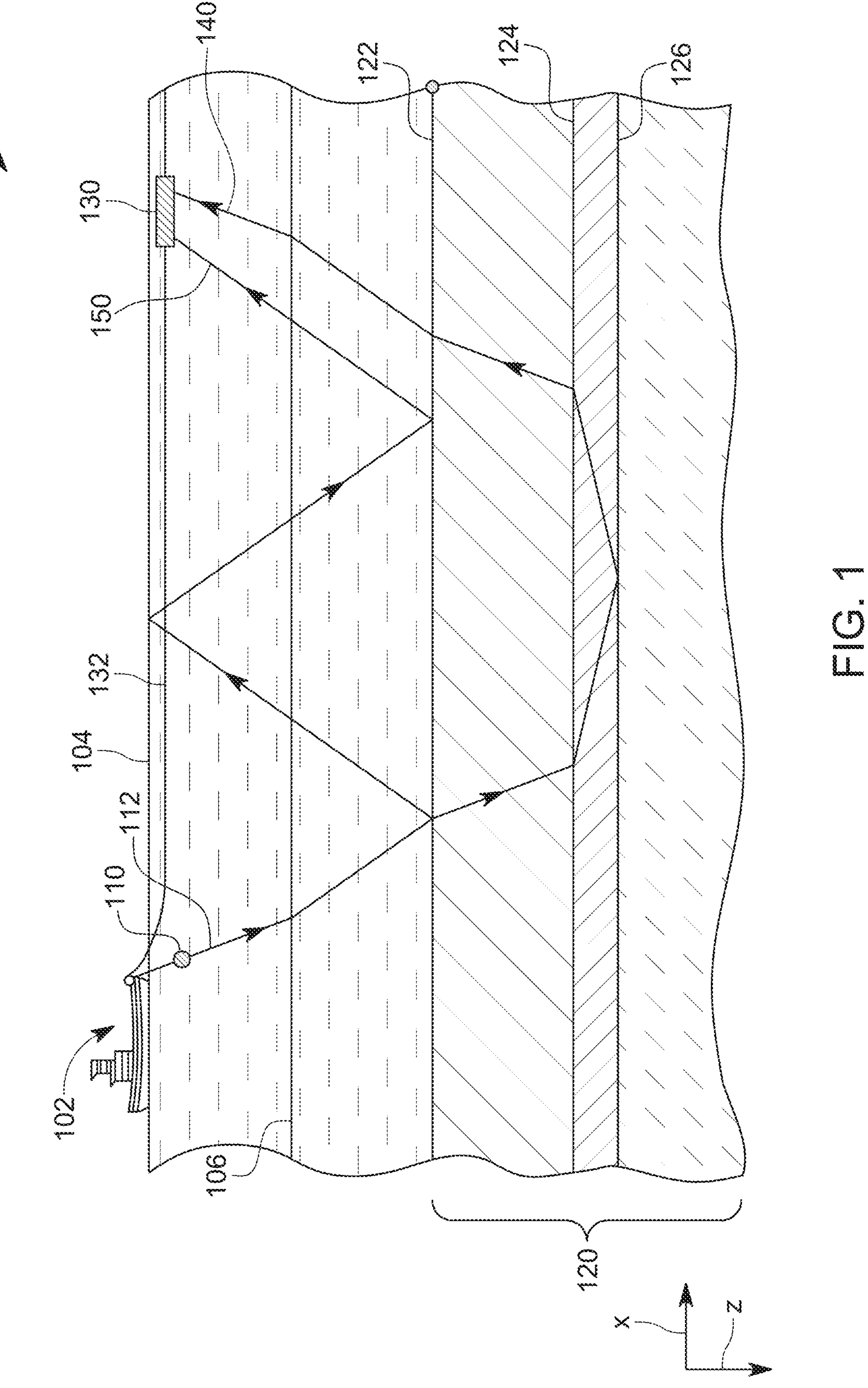
FIG. 1 is a schematic diagram illustrating a marine seismic data acquisition system that acquires primaries and multiples.
Figure 3:
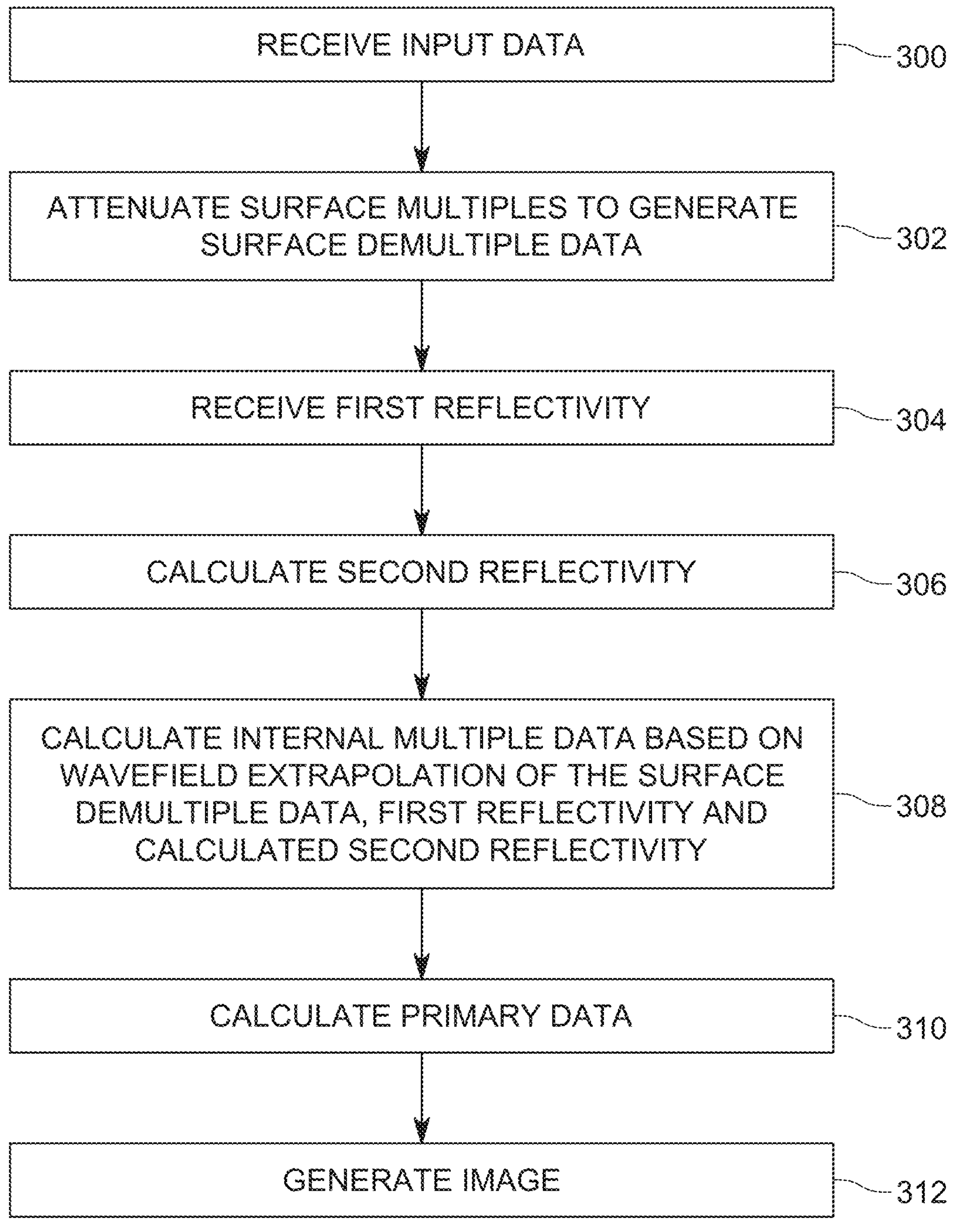
FIG. 3 is a flow chart of a method for internal multiple calculation and removal of the internal multiples from the seismic data.

According to various embodiments, a process or method of multiple attenuation is implemented based on a model that uses upper and lower reflectivities in the subsurface. More specifically, as schematically illustrated in FIG. 3, the method includes a step 300 of receiving input data d 200, where the input data is seismic data collected, for example, with the system shown in FIG. 1. The input data 200 includes multiples, e.g., surface and internal multiples 212, 214, in addition to the primary arrivals 210. In optional step 302, the method attenuates surface-related multiples 212 from the input data 200 to create surface demultiple data (210, 214). Any known method may be used to attenuate the surface-related multiples, for example, [1], [2], [4], [5], [10], or [12]. In one application, step 302 may be deferred until later, i.e., the method may determine and remove the internal multiples without first removing the surface-related multiples. For this case, the data 210, 212, and 214 is used in step 310 discussed below.

In step 304, the method receives a first reflectivity $r_1$ (to be discussed later in more detail), and in step 306, the method derives/calculates a second reflectivity $r_2$, different from the first reflectivity $r_1$, using wavefield extrapolation of the surface demultiple data 210, 214, and a reflection r in the first reflectivity $r_1$. This step is also discussed in more detail later. Note that the first and second reflectivities describe different spatial regions in the surveyed area, and each of the first and second reflectivity may include plural reflections r. In step 308, the method uses (1) wavefield extrapolation of the surface demultiple data 210, 214, (2) a reflection in the first reflectivity, and (3) a reflection in the second reflectivity, to predict internal multiple data 214, and subtracts in step 310 the internal multiple data 214 from the input data 200 or from the surface demultiple data 210, 214 to obtain the primary data 210. In step 312, the method generates an image of the subsurface indicative of geophysical features associated with oil or gas resources. In one application, the image of the subsurface is used for locating wind turbine sites, or identifying other resources, for example, ore, minerals, or for determining potential $CO_2$ storage reservoirs, or geothermal resources. In other words, the image generated with the method discussed above may be used for any purpose related to identifying a subsurface feature.

The method of FIG. 3 follows a wave-equation deconvolution approach for internal multiple modelling. This approach is detailed next. The input data 200 that is used for calculating the internal multiples may be data recorded by any sensor type, examples include hydrophones, geophones, particle motion sensors, particle velocity sensors, accelerometers, near-field hydrophones, near-field accelerometers or other sensor configured to detect seismic energy. The data may be from towed streamer, ocean-bottom sensor, OBS, (node or cable) acquisition, land acquisition, transition zone campaign, or borehole (e.g., vertical seismic profile (VSP), distributed acoustic sensing (DAS)). The image of the subsurface may be used to identify/interpret/exploit a subsurface resource, such as, but not limited to, oil and gas, geothermal, mineral reserves, etc.

The data may be recorded at a constant datum, or a variable datum (e.g., variable depth streamer, or varying topography in land, e.g., floating datum, varying OBN sea-bed depth, etc.). In the case of land data, the geophone recordings may be propagated forwards and backwards to form the multiple image, and the multiple image may be used to predict multiples. In general, the terms OBN (ocean bottom node), OBC (ocean bottom cable), OBS (ocean bottom survey/sensor), and PRM (permanent reservoir monitoring) systems may be used interchangeably. The recorded data may be input to multiple imaging before or after wavefield separation. OBN receiver gather data may correspond to hydrophone, geophone (x, or, y, or, z), accelerometer, receiver-upgoing, receiver-downgoing, etc.

Reflectivity, also known as an image of the subsurface, the migrated image, or the image, is represented by the letter "r" herein and describes how the down-going wavefield may change into the up-going wavefield.

Seismic sources are used to generate the seismic waves, whose energies are then recorded by the various sensors as seismic data. The seismic source may be any type of seismic source, examples include airgun, pinger, sparker, boomer, marine vibrator, land vibrator, dynamite, etc. The source may be a single source (e.g., single airgun) or an array of sources (e.g., airgun array).

The concept of seismic reciprocity is well understood in the industry, meaning that the signal recorded by a receiver at a first position, following actuation of a source at the second position, would be the same as a receiver at the second position following actuation of a source at the first position. As such, the embodiments described herein may be applied using receiver-side propagation in the shot-domain or by source-side propagation in the receiver-domain.

Figure 2A:
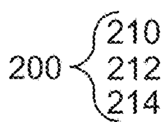
FIG. 2A schematically illustrates a primary arrival, FIG. 2B schematically illustrates a surface-related multiple, and FIG. 2C schematically illustrates an internal multiple.
Figure 2A:
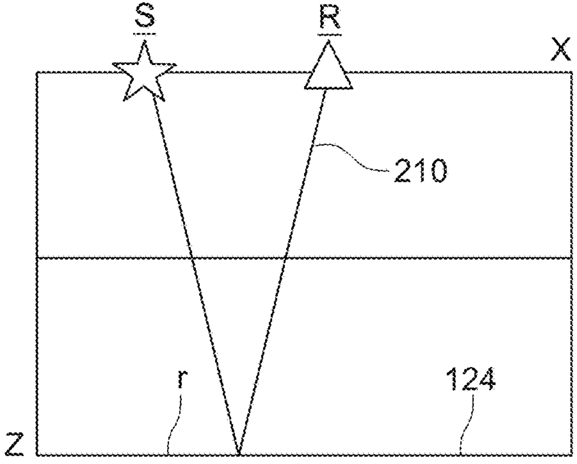
Figure 2B:
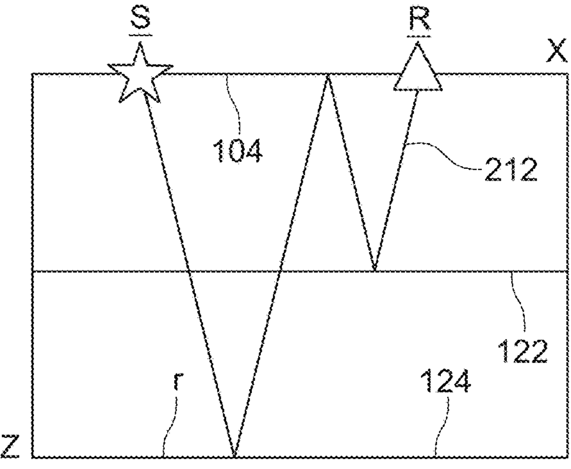
Figure 2C:
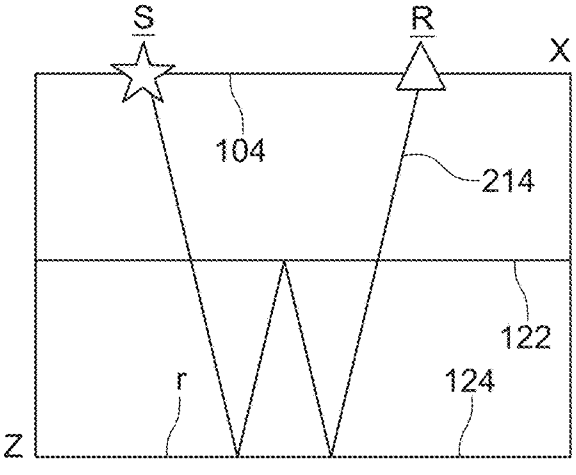

To determine the surface demultiple data 212, it is possible to use any known method in the field. For example, in one application, it is possible to use the method in [2]. However, this method requires as input the reflectivity r illustrated in FIG. 2B. The input reflectivity r may be calculated based on the method of [5], i.e., reformulating the multiple modelling equation (1) below as an optimization problem and iterating to find r, $$m(t,x,y)=F^{-1}\Phi(f,x,y,z)D_{\Phi}(f,x,y,z)r(x,y,z), \tag{1}$$

where $D_\Phi$ is the forward propagated data in matrix format to convolve by the reflectivity, r is the reflectivity and is found from a least squares inversion, $\Phi$ is the forward propagation operator, f is the frequency, $F^{-1}$ is the inverse Fast Fourier Transform (FFT) operator, and m is multiples data. When reflectivity, r, is derived by inversion, the recorded data is substituted for the multiples, m. The trivial solution of a unit spike at depth zero is avoided by having a minimum depth in the reflectivity image, analogous to the 'gap' in gapped deconvolution.

The reflectivity r of a plane/interface discussed above and used in the above noted multiples determination method, is understood herein to be an "image" of the surveyed subsurface. An image of the subsurface is generally understood to be a representation of the reflectivity in the earth, defined in space (x-z for 2D, and x-y-z for 3D). This may also be referred to as a migration, the migrated image or the reflectivity. Thus, these terms are used interchangeably herein. An image of the subsurface may be the result of a single-step or optimized migration.

In some embodiments, to form an image, an imaging condition may need to be applied to the data. In one application, the imaging condition is a mathematical function applied to the extrapolated down-going and up-going wavefields to form the image. The most common imaging condition is the cross-correlation imaging condition. Other options are the deconvolution imaging conditions, a variety of which are known in the field, for example, smoothing imaging condition, 2D deconvolution imaging condition or multi-dimensional deconvolution imaging condition.

Figure 4A:
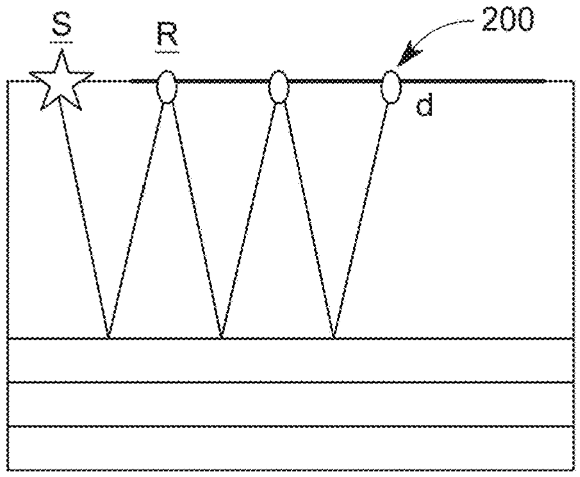
FIGS. 4A to 4C schematically illustrate the application of linear operators on the seismic data for one-way extrapolation to model multiples.
Figure 4B:
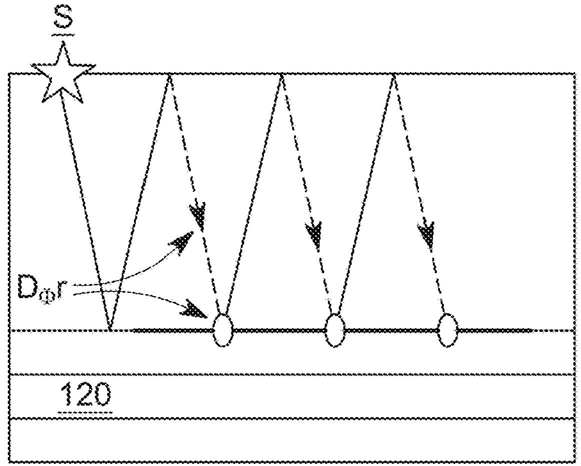
Figure 4C:
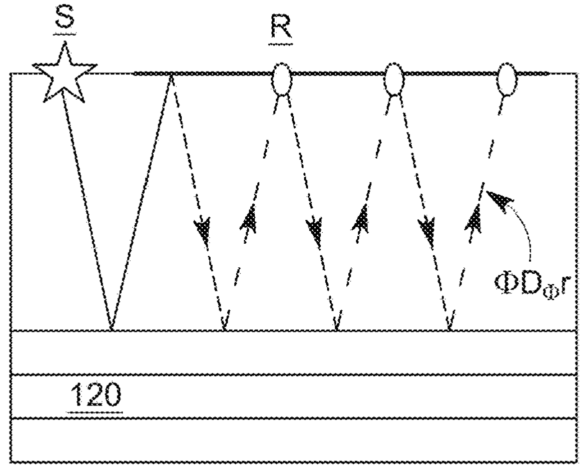

The linear operations of equation (1) are pictorially illustrated in FIGS. 4A to 4C. FIG. 4A shows the recorded data d 200, which includes the primaries and the multiples (both surface and internal). FIG. 4B shows the recorded data d being forward extrapolated (with the forward propagation operator $\Phi$) into the subsurface 120, following which it reflects $D_\Phi r$, and is then forward extrapolated back to the surface $\Phi D_\Phi r$, as shown in FIG. 4C. The matrix notation of the forwards propagated data, $D_\Phi$, is defined so that each frequency (f) of the forward propagated data at a given subsurface location (x, y, z) will be scaled by the reflectivity (r) at the same location. Note that each of these steps is based on the wave equation, and thus, this is the reason that the method is based on the wave equation deconvolution method. This approach can also be used for OBN residual demultiple [10] and land surface related multiple attenuation [12]. As noted above, this approach may be used for determining the reflectivity r and then calculate the surface multiples, which are used in step 302.

More specifically, to estimate the status of the seismic energy when moving from one location to another location in the subsurface, the concept of wavefield extrapolation, also known as wavefield propagation, is used. Seismic data extrapolation is a method to simulate recordings of a wavefield at a position other than to which it was recorded. For example, for horizontal towed streamer acquisition, it is possible to record hydrophone measurements at a depth of 12 m. Then, it is possible to extrapolate these measurements to a new datum, for example, at 100 m depth. The extrapolation may use an estimate of the subsurface properties, e.g., velocity, anisotropy, absorption, etc. The extrapolation may be with one-way or two-way extrapolations and may be forward or reverse in direction.

Figure 5A:
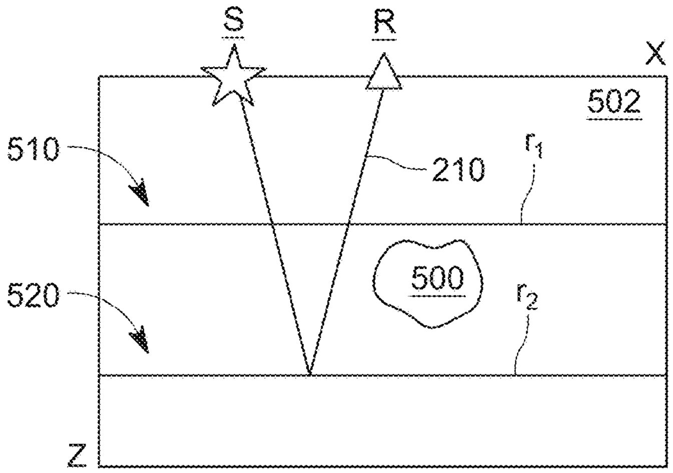
FIGS. 5A to 5F schematically illustrate the propagation and reflections of the seismic data for generating the internal multiples.

With regard to steps 304 and 306, the method in [7] describes an approach where upper and lower reflectivities are used to model internal multiples by following the steps illustrated in FIGS. 5A to 5F. FIG. 5A illustrates the input data that is used, and in this case, this data may be the data 210 and 214 generated in step 302, as the surface multiples 212 have been calculated and removed from the input data 200. FIG. 5A also shows a first formation 510, which is responsible for the first reflectivity $r_1$, and a second formation 520, which is responsible for the second reflectivity $r_2$. Both formations are located in the subsurface 502. Note that the two formations 510 and 520 are actual, physical formations that exist in the subsurface and the target 500 of the survey may be located at a depth between the two formations, as illustrated in FIG. 5A, above the top formation 510 (not shown), or below the bottom formation 520 (not shown). Each of the first and second formations may include plural interfaces or a single interface, and thus, each of these formations may include plural reflections r, as schematically illustrated in FIGS. 5A to 5F.

The method assumes that one of the two reflectivities $r_1$ and $r_2$ is known, for example, $r_1$, and thus, in step 304, the first known reflectivity is received. The second reflectivity $r_2$ is not known. One skilled in the art would understand that the second reflectivity may be known and the first one needs to be calculated. The known reflectivity may be acquired from a previous survey, or may calculated with various methods. For example, the known reflectivity may come from primary imaging or multiple imaging, for example, following [10, 11]. The known reflectivity may be represented by spike(s) at key horizon(s), or by a limited depth range representative of the main reflections. While either the upper or lower reflectivity may be treated as known, in practice, a known lower reflectivity may be preferable as primaries and surface-related multiple imaging will create upgoing reflections, whereas the downgoing reflectivity is generally unknown.

Figure 5B:
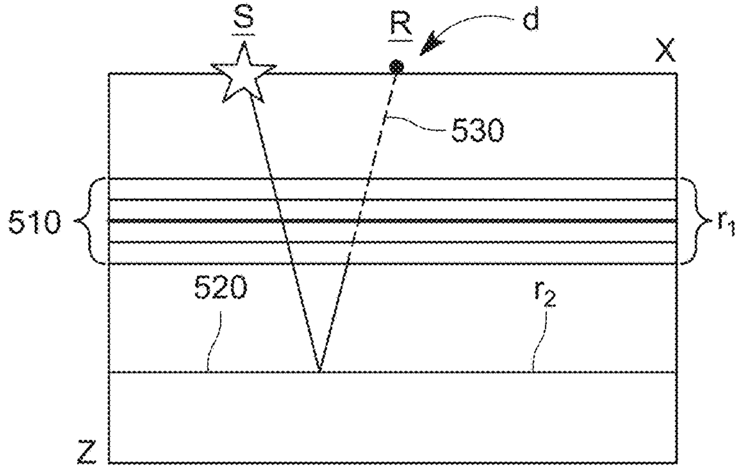
Figure 5C:
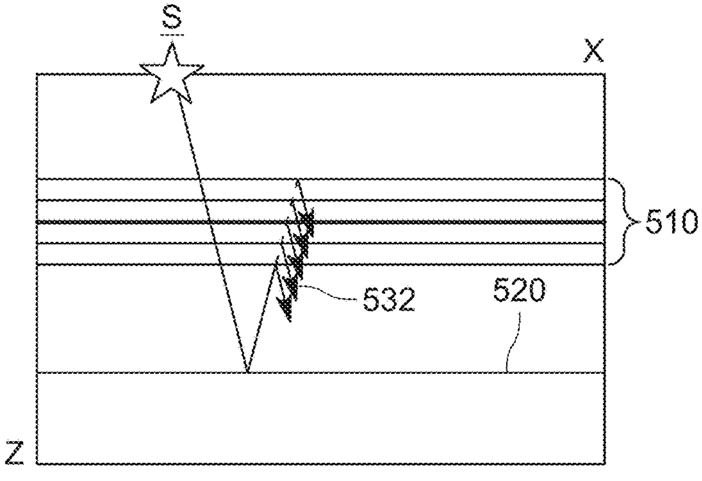
Figure 5D:
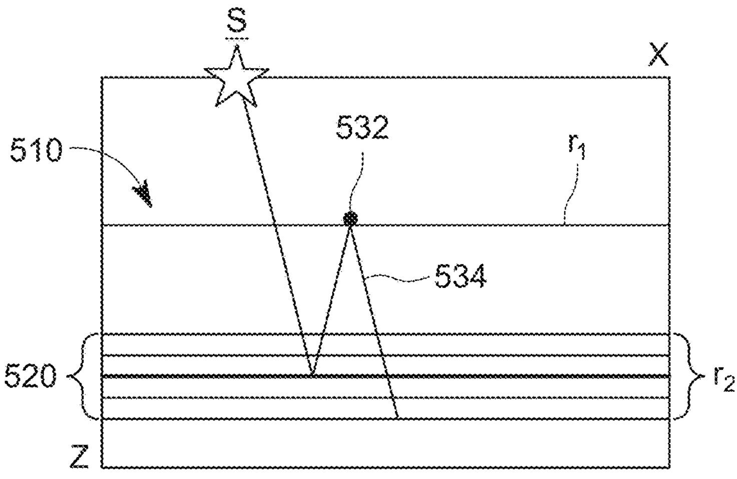
Figure 5E:
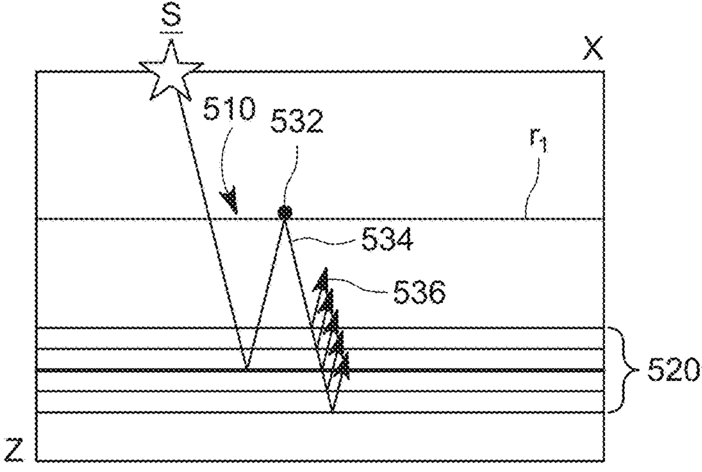
Figure 5F:
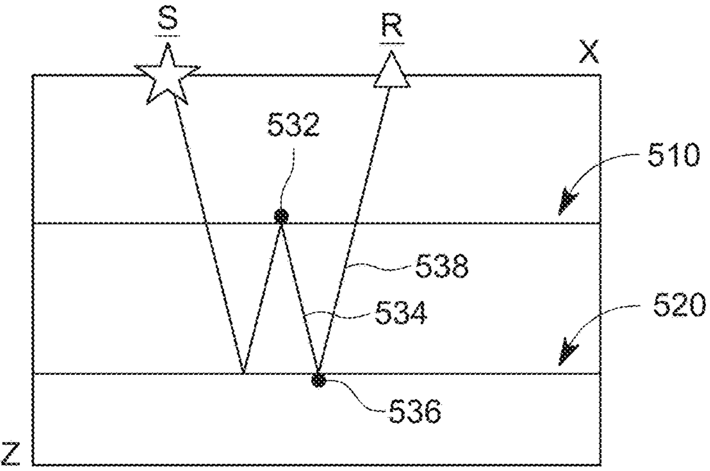

In step 306, the method calculates the second reflectivity $r_2$ based on the first reflectivity $r_1$. Step 306 may include the following substeps. As shown in FIG. 5B, the recorded data d is back propagated 530 from the receiver R to each depth (interface) of the first formation 510, which is the upper formation in this embodiment (i.e., the formation above the target 500). Next, as shown in FIG. 5C, the waves are reflected downward at each depth in the upper formation 510, which results in the down reflected waves 532. Note that all these propagations are described by the wave equation, and thus, there is an operator that describes each of them. The down reflected waves 532 are then forward propagated to each depth in the second formation 520, as illustrated in FIG. 5D by waves 534. For simplicity, FIG. 5D shows a single down reflected wave 534, but in fact there are plural waves as indicated in FIG. 5C. Each down reflected wave 534 is then up reflected by the interfaces/layers in the second formation 520, as illustrated in FIG. 5E, thus generating up reflected waves 536. The down reflected waves may be combined prior to forward propagation into the second formation. This may involve propagating all down reflected wavefields to the lower depth level in the upper reflectivity and summing together. The up reflected waves 536 are forward propagated until reaching a corresponding receiver R, as illustrated in FIG. 5F by forward propagated up reflected waves 538. The up reflected waves may be combined prior to propagation to the receiver, for example propagating to the upper depth level in the lower reflectivity and summing together. Each of these waves may be mathematically described by a corresponding operator based on the wave equation, and thus, the internal reflection shown in FIG. 5F (see waves 532 to 538) can be modeled and calculated, as discussed later.

While the method described in [7] requires the knowledge of the first and second reflectivies in the first and second formations 510 and 520, respectively, the method discussed herein with regard to FIG. 3 is different, in the sense that only one reflectivity is needed while the second one is calculated. More specifically, the method of FIG. 3 defines a least-squares optimization problem assuming that one of the reflectivities is known and the other reflectivity is not known. This results in two potential least-squares problems, depending on whether the upper reflectivity or the lower reflectivity is known, as now discussed.

Assuming that the upper reflectivity $r_1$ is known, the following approach may be used for calculating the lower reflectivity $r_2$ in step 306. The least-square optimizing problem is defined as follows:

$$\varepsilon(r_2)=[d-\Phi[\Phi R_1 D_{-\Phi}]r_2]^2. \tag{2}$$

Where ε is the error function, d is the input data, and operators Φ and D were discussed above with regard to equation (1). $R_i$, with i being 1 or 2, stands for an operator corresponding to the known reflection, $R_1$ in this case, while $r_1$ describes the unknown value of the reflectivity, $r_2$ in this case. The terms in equation (2) are as follows:

- $D_{-\Phi}$ corresponds to the input data d back propagated into the upper reflectivity $r_1$ as illustrated by element 530 in FIG. 5B.
- $R_1D_{-\Phi}$ corresponds to the downwards reflecting wavefield 532 in FIG. 5C. This results from the multiplication of $D_{-\Phi}$ by the upper reflectivity $R_1$.
- $\Phi R_1D_{-\Phi}$ corresponds to the forwards propagated downwards reflecting wavefield 534. This is the forwards propagation 534 of the downwards reflecting wavefield 532, using the forward propagation operator, ¢.
- $[\Phi R_1\, D_{-\Phi}]r_2$ corresponds to the upwards reflecting wavefield 536 as illustrated in FIG. 5E. This results from the multiplication of the forwards propagated downwards reflecting wavefield 534 by the lower reflectivity, $r_2$.
- $\Phi[\Phi R_1D_{-\Phi}]r_2$ corresponds to the upwards reflecting wavefield 536 being forward propagated 538 to the receivers R, as illustrated in FIG. 5F. This relates to the modelled multiples, which should ideally equal the recorded data, d.
- $\varepsilon(r_2)$ is the error, i.e., the sum-of-squares misfit between the recorded data d and the modelled multiples. This is a function of the lower reflectivity $r_2$.

Assuming that the lower reflectivity $R_2$ is known, the following approach may be used for calculating the upper reflectivity $r_1$ in step 306. The least-square optimizing problem is defined as follows:

$$\varepsilon(r_1)=[d-\Phi R_2\Phi][D_{-\Phi}r_1]^2. \tag{3}$$

where ε is the error function, d is the input data, and operators Φ and D were discussed above with regard to equation (1). $R_i$, with i being 1 or 2, stands for an operator corresponding to the known reflection, while $r_1$ describes the unknown value of the reflectivity. The terms in equation (3) are as follow:

$D_{-\Phi}$ corresponds to the input data d back propagated into the upper reflectivity $r_1$, as illustrated in FIG. 5B.

$D_{-\Phi}r_1$ corresponds to the downwards reflecting wavefield 532, as illustrated in FIG. 5C. This results from the multiplication of $D_{-\Phi}$ by the upper reflectivity, $r_1$.

$\Phi[D_{-\Phi}r_1]$ corresponds to the forwards propagated downwards reflecting wavefield 534, as shown in FIG. 5D. This is the forwards propagation of the downwards reflecting wavefield 532, using the forward propagation operator, Φ.

$R_2\Phi[D_{-\Phi}r_1]$ corresponds to the upwards reflecting wavefield 536, as shown in FIG. 5E. This results from the multiplication of the forwards propagated downwards reflecting wavefield 534 by the lower reflectivity, $R_2$.

$\Phi R_2 \Phi[D_{-\Phi} r_1]$ corresponds to the upwards reflecting wavefield being forward propagated 538 to the receivers $\underline{R}$, as shown in FIG. 5F. This relates to the modelled multiples, which are typically constraint to equal the recorded data, d.

$\varepsilon(r_1)$ is the error, i.e., the sum-of-squares misfit between the recorded data d and the modelled multiples. It is a function of the upper reflectivity $r_1$.

Which ever formulation is used (i.e., equation (2) or (3)), iterative solvers may be employed to find the minimum error $\varepsilon$. As described in [5] and in [10], data- and/or model-domain sparseness weights may be used. In these equations, the data is assumed to be in the temporal frequency domain. An inverse Fourier transform, following $F^{-1}$ in equation (1), may optionally be used for calculating the multiples.

Based on the known reflectivity received in step 304, and the reflectivity calculated in step 306, as detailed above, step 308 calculates the internal multiples 214 by using wave equation extrapolation (see reference [7]). Note that the operators introduced in equations (2) and (3) are also used to calculate the internal multiples, based on the FIGS. 5A to 5F, after calculating the second reflectivity. Each internal multiple may be modelled with the operators discussed above and as illustrated in FIGS. 5A to 5F. Once the internal multiples are calculated, they may be subtracted from the recorded seismic data d, to generate the primary arrival 210.

When multiples are subtracted, either a numerical 'straight' subtraction or an adaptive subtraction may be used. Adaptive subtractions may derive a least-squares filter to improve the subtraction of multiples. Adaptive subtractions may be in the space-time domain, or in another domain; e.g., taup, curvelet domain.

Figure 6A:
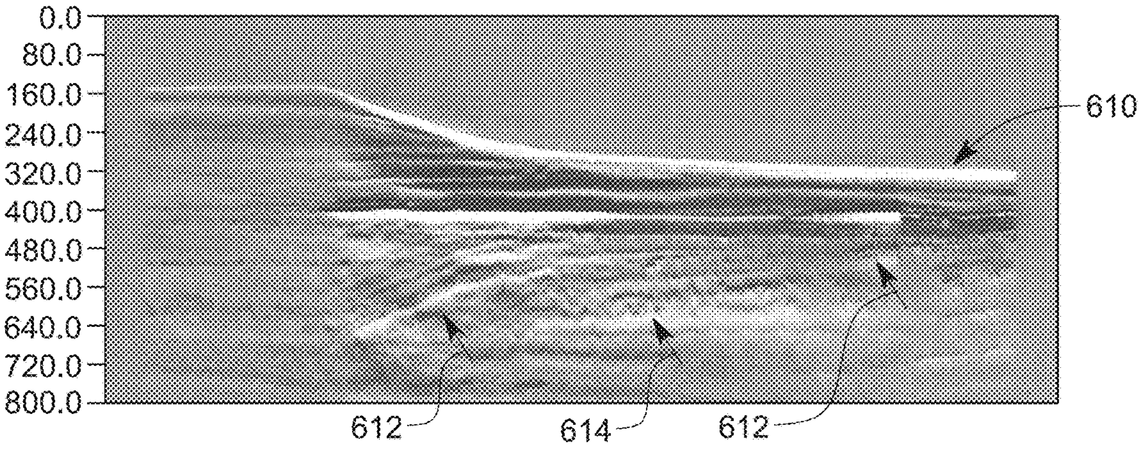
Figure 6B:
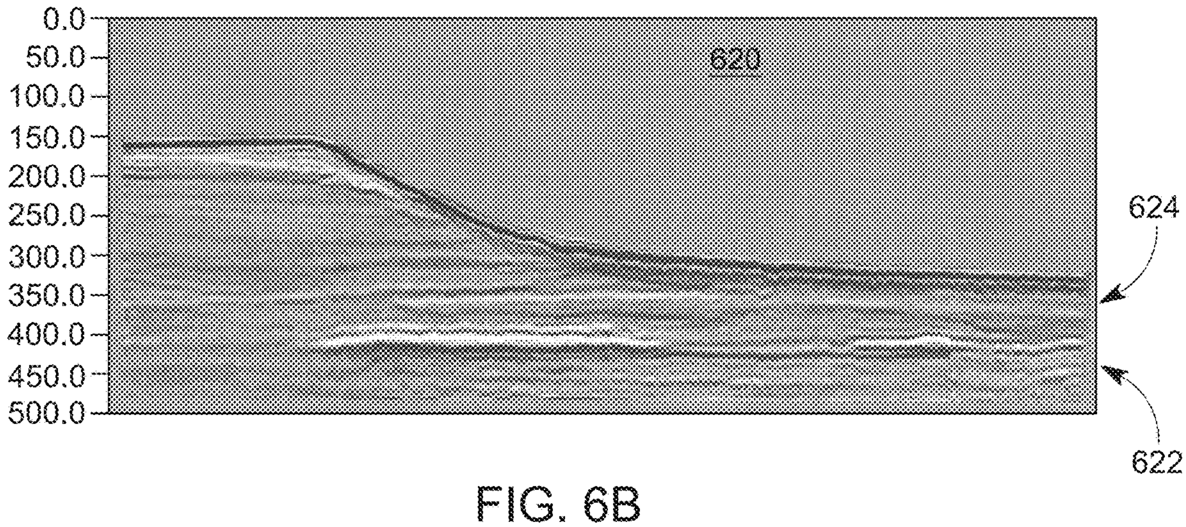
FIG. 6B illustrates the wave-equation deconvolution reflectivity for the same subsurface.
Figure 7A:
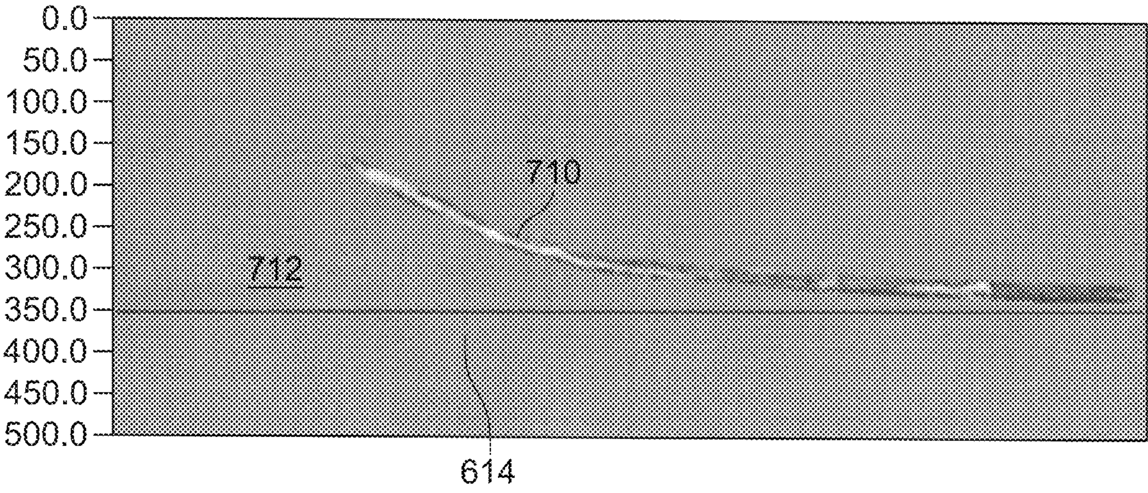
Figure 7B:
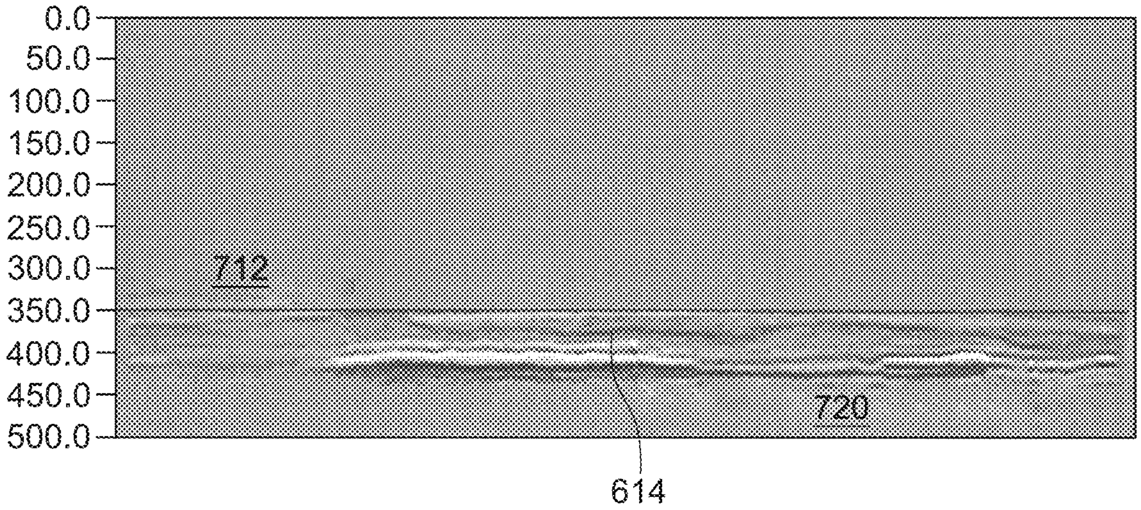
FIG. 7B illustrates the lower reflectivity, provided by surface-related wave-equation deconvolution.

The method discussed above has been applied to a marine dataset with internal multiples 612 generated between the water bottom 610 and a shallow gas reflector 614, as illustrated in FIG. 6A. For this example, the surface-related wave-equation deconvolution of [5], equation (1), was applied to the input dataset d. This resulted in a surface-related wave-equation deconvolution reflectivity 620 as shown in FIG. 6B. The polarity of the wave-equation deconvolution 620 reflectivity is opposite to the regular imaging 612 due to the polarity reversal of the surface-related reflection incorporated in the surface-related multiple generation mechanism. In this example, the lower part 622 of the surface-related wave-equation deconvolution image 620 was used for the lower-reflectivity part 520 of internal wave-equation deconvolution (i.e., $R_2$ in equation (3), see FIG. 7B). The upper-reflectivity ($r_1$ term in equation (2), see FIG. 7A) was calculated using conjugate gradients inversion with reflectivity-domain sparseness weights centered on the water-bottom. The upper-reflectivity shows a strong white response 710 (see FIG. 7A) above the lower-reflectivity gas 614 (see FIG. 7B, and note that region 720 has been muted for the lower reflectivity). This provides confidence to this internal multiple imaging, as the upper-reflectivity (which was found by inversion according to equation (3)) will only be illuminated above the gas in the lower reflectivity. FIGS. 7A and 7B also show a splitting horizon 712.

Figure 8A:
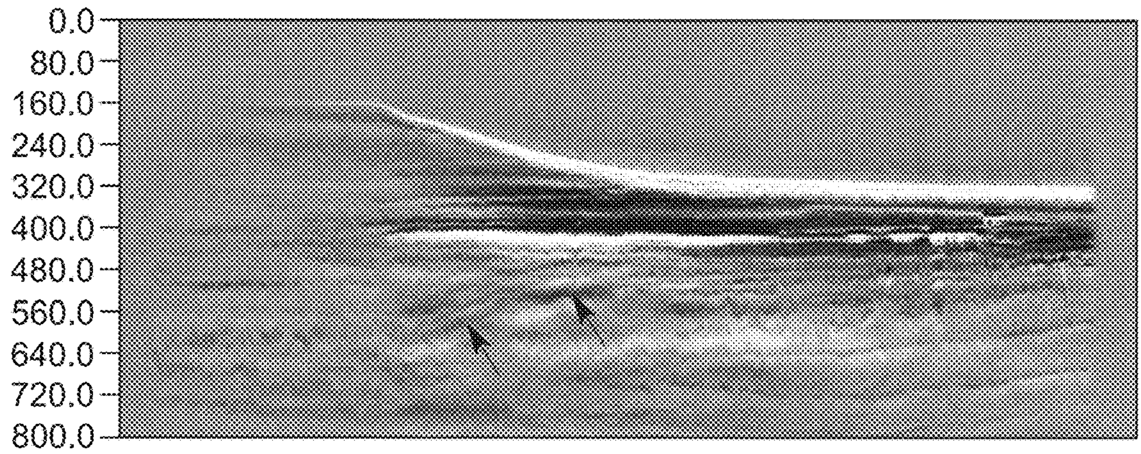
FIGS. 8A to 8C illustrate the internal demultiple results obtained with the method of FIG. 3, where
Figure 8B:
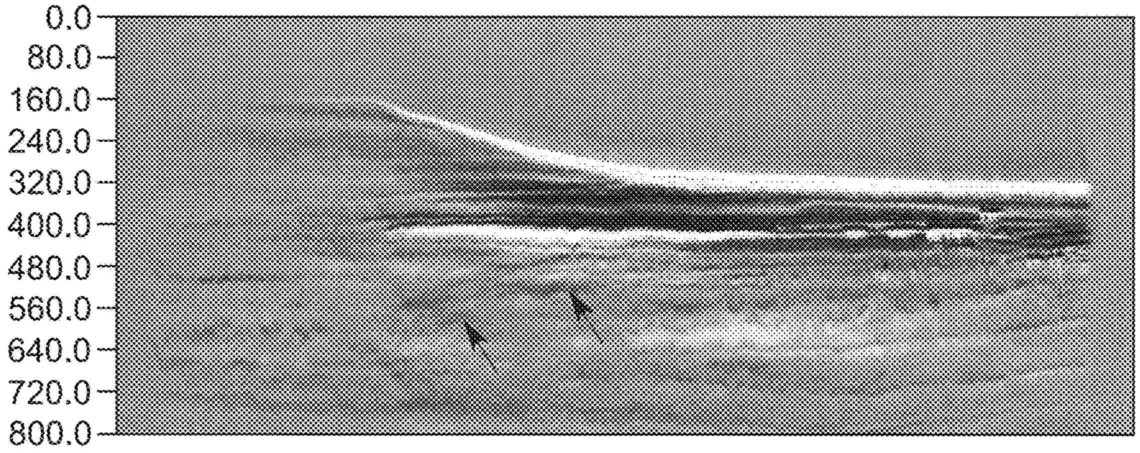
Figure 8C:
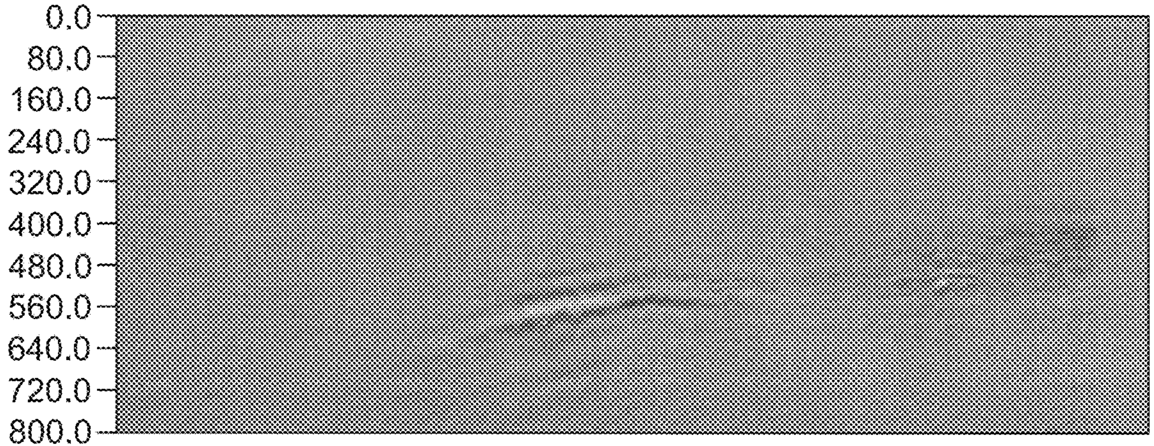

The upper and lower reflectivities from FIGS. 7A and 7B were then used as input to the internal multiple modelling approach of [7], for calculating the internal multiples. FIG. 8A shows the input data d, FIG. 8C shows the modelled internal multiples, and FIG. 8B shows the data after multiple attenuation using a straight subtraction. The arrows in FIG. 8B highlight the internal multiple that has been attenuated. While a straight subtraction was used in this example, in general an adaptive subtraction may be preferred.

The method for internal multiple attenuation of seismic data associated with a subsurface discussed with regard to FIG. 3 may also be expressed as follows. The method includes a step 300 of receiving seismic data d associated with the subsurface 502, wherein the seismic data d includes primaries 210, and internal multiples 214, a step 304 of receiving 304 a first reflectivity r associated with a first formation 510 in the subsurface 502, a step 306 of calculating 306 a second reflectivity $r_2$ associated with a second formation 520 in the subsurface 502, based on wavefield extrapolation of the seismic data d and a reflection in the first reflectivity $r_1$, wherein the second formation 520 is different from the first formation 510, a step 308 of calculating the internal multiples 214 using wavefield extrapolation of the seismic data d, the reflection in the first reflectivity $r_1$, and a reflection in the second reflectivity $r_2$, a step 310 of attenuating the internal multiples 214 from the seismic data d by subtraction, and a step 312 of generating an image of the subsurface indicative of geophysical features associated with oil or gas resources.

The method may further include calculating surface related multiples; and removing the surface related multiples from the input data before the step of calculating the second reflectivity $r_2$. In one application, each of the first reflectivity and the second reflectivity includes plural reflections corresponding to plural interfaces or a single interface. The first reflectivity may be received from another seismic survey. The step of calculating the second reflectivity $r_2$ uses an error function between (1) the seismic data d and (2) a term determined by (a) a back propagation of the input data, from a location of a receiver to the first formation, (b) downwards reflecting wavefields within the first formation, (c) forwards propagating wavefields toward the second formation, (d) upwards reflecting wavefields within the second formation, and (e) forwards propagating wavefields, from the second formation toward the receiver. The method may further include applying a least-squares method for determining a minimum of the error function. In one application, the first formation may be unknown. In another application, the second formation may be unknown. While the method of FIG. 3 was described for marine towed streamer data, the same approach may also be used for ocean-bottom receiver (OBN, PRM, OBS, OBC), land, or transition zone data.

Figure 9:
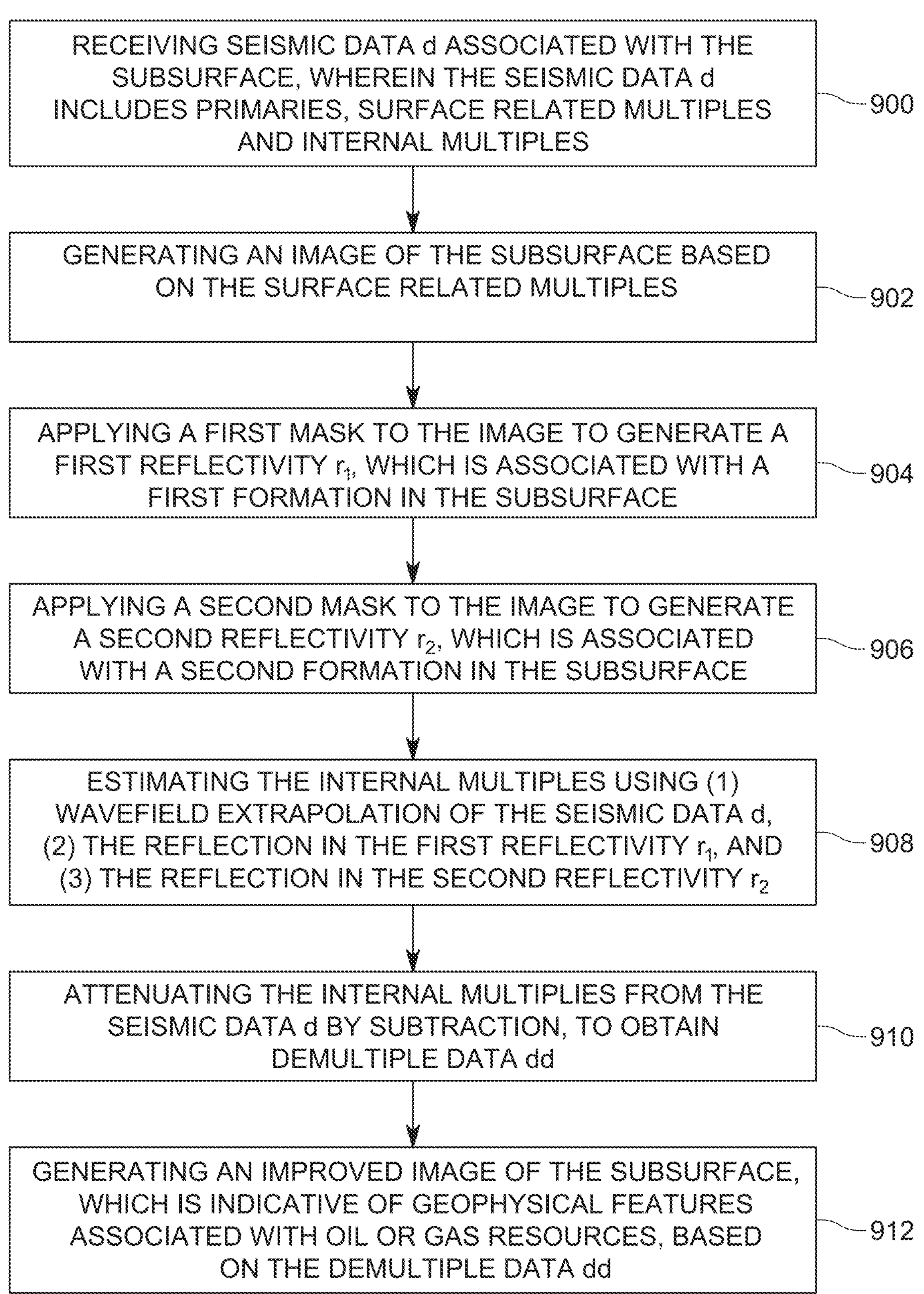
FIG. 9 is a flow chart of another method for internal multiple calculation and removal of the internal multiples from the seismic data.
Figure 10:
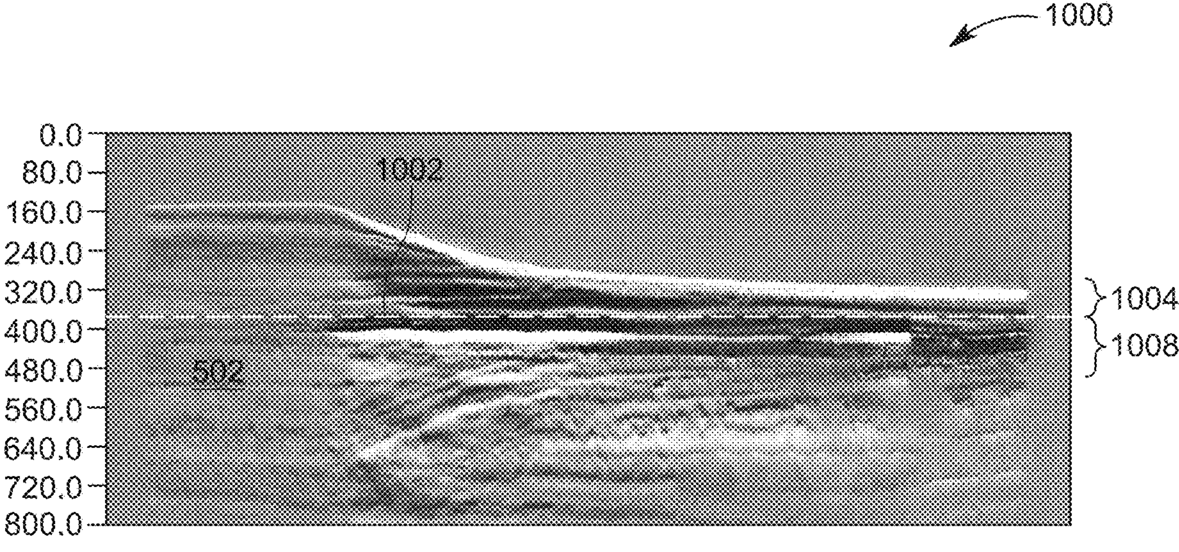
FIG. 10 schematically illustrates the applications of masks for calculating reflectivities associated with two different formations in a subsurface.

According to a different embodiment, a method for internal multiple attenuation of seismic data associated with a subsurface may determine the first and second reflectivies $r_1$ and $r_2$ from an image of the subsurface that is calculated with the full input data d, as illustrated in FIG. 9. More specifically, the method includes a step 900 of receiving the seismic data d associated with the subsurface 502, where the seismic data d includes primaries 210, surface related multiples 212, and internal multiples 214. In step 902, the method generates an image 1000, see FIG. 10 (which corresponds to FIG. 6A for this specific example, but any image of the subsurface may be used), of the subsurface 502, based on surface related multiples 212. Any known method in the art may be used for generating the surface related multiples image 1000. Note that the image 1000 is generated not by using primaries alone, as some of the existing methods (e.g., [7]) are using, but at least partially by the multiples. The method then applies in step 904 a first mask to the image 1000, to mask (e.g., suppress) all the parts of the traces that are below line 1002 in FIG. 10, to generate a first reflectivity $r_1$, which is associated with a first formation 1004 in the subsurface 502, which is located above line 1002. Next, the method applies in step 906 a second mask to the image 1000, to mask all the parts of the traces that are above line 1002 in FIG. 10, to generate a second reflectivity $r_2$, which is associated with a second formation 1008 in the subsurface 502. In step 908, the internal multiples 214 are estimated using (1) wavefield extrapolation of the seismic data d, (2) the reflection in the first reflectivity $r_1$, and (3) the reflection in the second reflectivity $r_2$. In step 910, the internal multiples 214 are attenuated from the seismic data d by subtraction, to obtain demultiple data dd. In step 912, the method generates an improved image (not shown) of the subsurface, which is indicative of geophysical features associated with oil or gas resources, based on the demultiple data dd.

In one application, each of the first reflectivity and the second reflectivity includes plural reflections corresponding to plural interfaces or a single interface. The step of generating an image may include wavefield extrapolating the seismic data d to first and second depths, corresponding to the first and second formations, to obtain first and second extrapolated seismic data, scaling the first and second extrapolated seismic data with the first and second reflectivities, respectively, forward propagating the scaled first and second extrapolated seismic data, to a receiver plane, and calculating values of the first and second reflectivities. Any of the methods discussed above may be used for calculating the first and second reflectivities.

Figure 11:
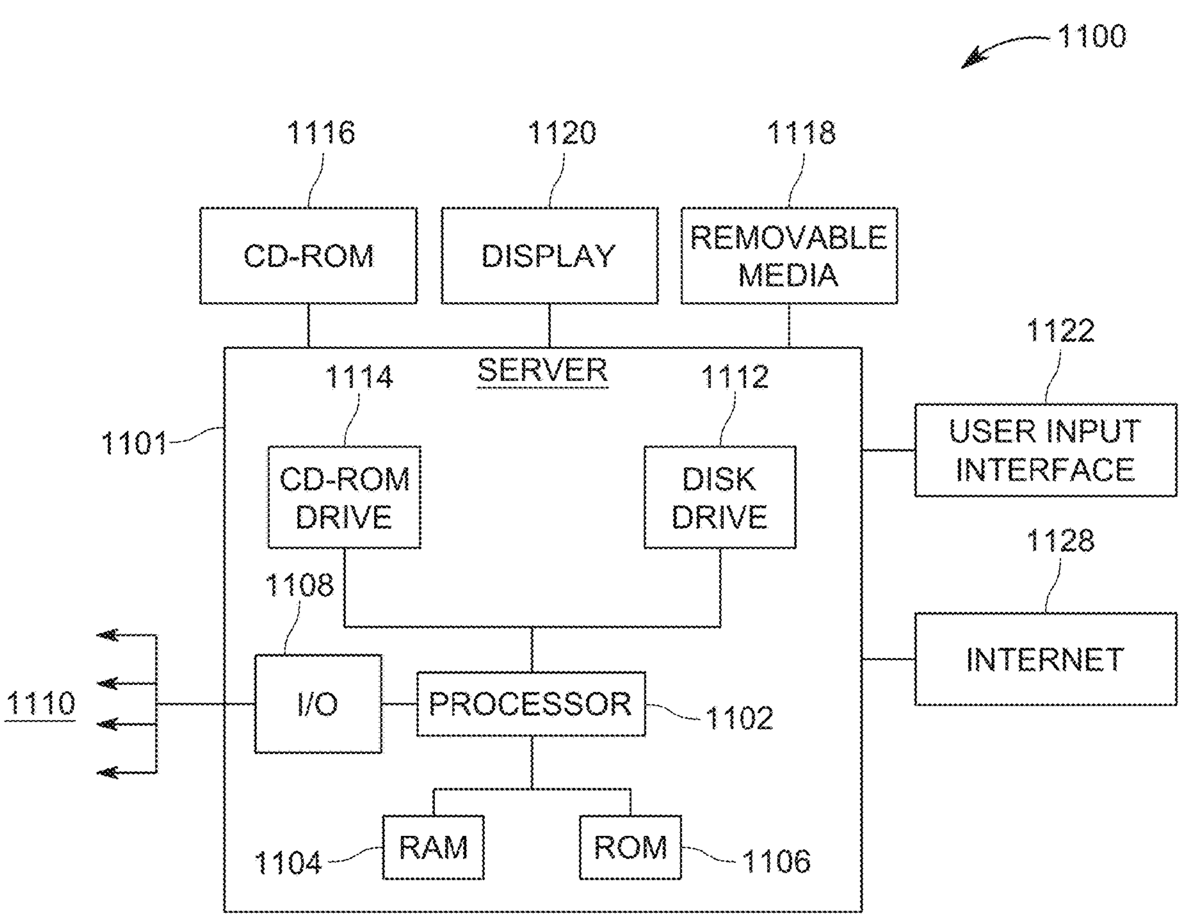
FIG. 11 is a schematic diagram of a computing device configured to implement methods for processing data according to the embodiments discussed herein.

Any of the above discussed methods may be implemented in a computing device, whose schematic is shown in FIG. 11. Hardware, firmware, software or a combination thereof may be used to perform the various steps and operations of the above-described methods. The computing device 1100 may include a server 1101, which has a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The CPU 1102 communicates with other internal and external components through input/output (I/O) circuitry 1108 and bussing 1110, to receive the data acquired using a streamer, OBN, DAS, land nodes, etc. and output one or more of the multiples, the primaries and/or the image of the geological formation. The processor 1102 carries out a variety of functions as are known in the art, as dictated by software and/or firmware instructions.

The server 1101 may also include one or more data storage devices, including hard drives 1112, CD-ROM drives 1114, and other hardware capable of reading and/or storing information such as DVD, etc. In one embodiment, software for carrying out the above-discussed methods may be stored and distributed on a CD-ROM or DVD 1116, a USB storage device 1118 or other form of media capable of portably storing information. These storage media may be inserted into, and read by, devices such as the CD-ROM drive 1114, the disk drive 1112, etc. Server 1101 may be coupled to a display 1120, which may be any type of known display or presentation screen, such as LCD, plasma display, cathode ray tubes (CRT), etc. The image of the geological formation or graphs similar to the ones in FIGS. 6A to 6BE, 7A, 7B 10C, 8A to 8C, and 10 may be shown on a display 1120. A user input interface 1122 is provided and may include one or more user interface mechanisms such as a mouse, keyboard, microphone, touchpad, touch screen, voice-recognition system, etc.

Server 1101 may be coupled to other devices, such as sources, receivers, etc. The server may be part of a larger network configuration as in a global area network (GAN) such as the Internet 1128, which allows ultimate connection to various landline and/or mobile computing devices.

The disclosed embodiments enable processing seismic data that identify internal multiples. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Berkhout, A. J. and Verschuur, D. J. Estimation of multiple scattering by iterative inversion, Part I: theoretical consideration. *Geophysics,* 62(5), 1586-1595.

[2] Pica, A., Poulain, G., David, B., Magesan, M., Baldock, S., Weisser, T., Hugonnet, P. and Herrmann, P. 3D surface-related multiple modeling, principles and results. 75*th SEG Annual International Meeting*, Expanded Abstracts, 2080-2083.

[3] Wang, M., and Hung, B. 3D inverse scattering series method for internal multiple attenuation. EAGE conference and proceedings.

[4] Biersteker, J. MAGIC: Shell's surface multiple attenuation technique. 71*st* *SEG Annual International Meeting*, Expanded Abstracts, 1301-1304.

[5] Poole, G. Shallow water surface related multiple attenuation using multi-sailline 3D deconvolution imaging. 81st EAGE Conference and Exhibition, Extended Abstracts, Tu R1 5.

[6] Jacubowicz, H. Wave equation predication and removal of interbed multiples. EAGE conference and proceedings.

[7] Pica, A. and Delmas, L., 2008, Wave equation based internal multiple modeling in 3D: 78th Meeting, SEG, Expanded Abstracts, 2476-2480.

[8] Weglein, A. B., Gasparotto, F. A., Carvalho, P. M., and Stolt, R. H., 1997, An inverse scattering series method for attenuating multiples in seismic reflection data, Geophysics, 62, no. 6, 1975-1989.

[9] Wang, M., and Hung, B. 3D inverse scattering series method for internal multiple attenuation. EAGE conference and proceedings.

[10] Poole, G., Jin, Z., Irving, A., and Refaat, R. Adaption-free OBN demultiple using up-down deconvolution and wave-equation deconvolution. EAGE conference proceedings.

[11] Whitmore, N. D., Valenciano, A. A., Sollner, W. and Lu, S. Imaging of primaries and multiples using a dual-sensor towed streamer. 80th Annual International Meeting, SEG, Expanded Abstracts, 3187-3192.

[12] Poole, G., Farshad, M., Jin, Z. and Li, Brandon. Wave-equation deconvolution: A short-period demultiple tool for streamer, OBN and land environments. First-Break, Volume 40, December 2022, pp 59-64.

What is claimed is:

1. A method for internal multiple attenuation of seismic data associated with a subsurface, the method comprising:

receiving seismic data d associated with the subsurface, wherein the seismic data d is acquired by seismic sensors at a given datum and includes primaries and internal multiples;

receiving a first reflectivity $r_1$ associated with a first formation in the subsurface;

calculating a second reflectivity $r_2$ associated with a second formation in the subsurface, by simulating a wavefield between the first formation and the second formation, based on wavefield extrapolation of the seismic data d and a reflection in the first reflectivity $r_1$, wherein the second formation is different from the first formation;

calculating the internal multiples using a wave-equation operator that combines (1) the wavefield extrapolation of the seismic data d, (2) the reflection in the first reflectivity $r_1$, and (3) a reflection in the second reflectivity $r_2$;

attenuating the internal multiples from the seismic data d by subtraction to generate a primary wavefield; and generating an image of the subsurface by migrating the primary wavefield to map physical geophysical features associated with oil or gas resources.

2. The method of claim 1, wherein the input data additionally contains surface related multiples, further comprising:

calculating surface related multiples; and removing the surface related multiples from the input data before the step of calculating the second reflectivity $r_2$.

3. The method of claim 1, wherein each of the first reflectivity and the second reflectivity includes plural reflections corresponding to plural interfaces or a single interface.

4. The method of claim 1, wherein the step of calculating the second reflectivity $r_2$ uses an error function between (1) the seismic data d and (2) a term determined by (a) a back propagation of the input data, from a location of a receiver to the first formation, (b) downwards reflecting wavefields within the first formation, (c) forwards propagated wavefields toward the second formation, (d) upwards reflecting wavefields within the second formation, and (e) forwards propagating wavefields, from the second formation toward the receiver.

5. The method of claim 1, where the first reflectivity is the result of primary imaging or surface-related multiple imaging.

6. The method of claim 1, wherein the second formation is located deeper in the subsurface than the first formation.

7. The method of claim 1, wherein the first formation is located deeper in the subsurface than the second formation.

8. A computing system for internal multiple attenuation of seismic data associated with a subsurface, the computing system comprising:

an interface configured to receive seismic data d associated with the subsurface, wherein the seismic data d is acquired by seismic sensors at a given datum and includes primaries, and internal multiples; and a processor connected to the interface and configured to, receive a first reflectivity $r_1$ associated with a first formation in the subsurface;

calculate a second reflectivity $r_2$ associated with a second formation in the subsurface, by simulating a wavefield between the first formation and the second formation, based on wavefield extrapolation of the seismic data d and a reflection in the first reflectivity $r_1$, wherein the second formation is different from the first formation;

calculate the internal multiples using a wave-equation operator that combines (1) the wavefield extrapolation of the seismic data d, (2) the reflection in the first reflectivity $r_1$, and (3) a reflection in the second reflectivity $r_2$;

attenuate the internal multiples from the seismic data d by subtraction to generate a primary wavefield; and generate an image of the subsurface by migrating the primary wavefield to map physical indicative of geophysical features associated with oil or gas resources.

9. The computing device of claim 8, wherein the processor is further configured to:

calculate surface related multiples; and remove the surface related multiples from the input data before the step of calculating the second reflectivity $r_2$.

10. The computing device of claim 8, wherein each of the first reflectivity and the second reflectivity includes plural reflections corresponding to plural interfaces or a single interface.

11. The computing device of claim 9, wherein the processor is configured to calculate the second reflectivity $r_2$ by using an error function between (1) the seismic data d and (2) a term determined by (a) a back propagation of the input data, from a location of a receiver to the first formation, (b) downwards reflecting wavefields within the first formation, (c) forwards propagated wavefields toward the second formation, (d) upwards reflecting wavefields within the second formation, and (e) forwards propagating wavefields, from the second formation toward the receiver.

12. The computing device of claim 8, wherein the first reflectivity is the result of primary imaging or surface-related multiple imaging.

13. The computing device of claim 8, wherein the second formation is located deeper in the subsurface than the first formation.

14. The computing device of claim 8, wherein the first formation is located deeper in the subsurface than the second formation.

15. A method for internal multiple attenuation of seismic data associated with a subsurface, the method comprising:

receiving seismic data d associated with the subsurface, wherein the seismic data d is acquired by seismic sensors at a given datum and includes primaries, surface related multiples, and internal multiples;

generating an image of the subsurface based on the surface related multiples;

applying a first mask to the image to generate a first reflectivity $r_1$, which is associated with a first formation in the subsurface;

applying a second mask to the image to generate a second reflectivity $r_2$, which is associated with a second formation in the subsurface;

estimating the internal multiples by simulating a wavefield between the first formation and the second formation using (1) wavefield extrapolation of the seismic data d, (2) a reflection in the first reflectivity $r_1$, and (3) a reflection in the second reflectivity $r_2$;

attenuating the internal multiples from the seismic data d by subtraction, to obtain demultiple data dd; and generating an improved image of the subsurface, which is indicative of geophysical features associated with oil or gas resources, based on transforming the demultiple data dd into a physical representation of the geophysical features of the subsurface.

16. The method of claim 15, wherein each of the first reflectivity and the second reflectivity includes plural reflections corresponding to plural interfaces or a single interface.

17. The method of claim 15, wherein the step of generating an image comprises:

wavefield extrapolating the seismic data d to a first depth, corresponding to the first formation, to obtain first extrapolated seismic data;

scaling the first extrapolated seismic data with the first reflectivity to obtain first reflected seismic data;

forward propagating the first reflected seismic data to a second depth, corresponding to the second formation, to obtain second extrapolated seismic data;

scaling the second extrapolated seismic data with the second reflectivity to obtain second reflected seismic data; and forwards propagating the second reflected seismic data to a receiver.

* * * * *